C. O. PHILLIPS.
KNOB FASTENER.
APPLICATION FILED DEC. 16, 1913.

1,161,521.

Patented Nov. 23, 1915.

Witnesses
Frederick H Taylor

Inventor
C. O. Phillips
By Victor J. Evans
Attorney

UNITED STATES PATENT OFFICE.

CHARLES O. PHILLIPS, OF DETROIT, MICHIGAN.

KNOB-FASTENER.

1,161,521.  Specification of Letters Patent.  Patented Nov. 23, 1915.

Application filed December 16, 1913. Serial No. 807,109.

*To all whom it may concern:*

Be it known that I, CHARLES O. PHILLIPS, a citizen of the United States, residing at Detroit, in the county of Wayne and State of Michigan, have invented new and useful Improvements in Knob-Fasteners, of which the following is a specification.

This invention relates to knob fasteners and more particularly to knob fasteners and rose retainers.

The principal object of the invention is to provide simple and efficient means for adjustably connecting a knob to the knob spindle and in such manner that the rose is retained against the door without other fastening devices.

Further objects of the invention will appear as the following description is read in connection with the accompanying drawing, which forms a part of this application, and in which:—

Figure 1:
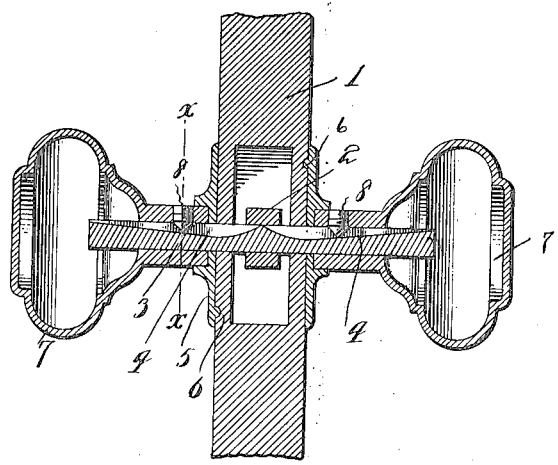
Figure 2:
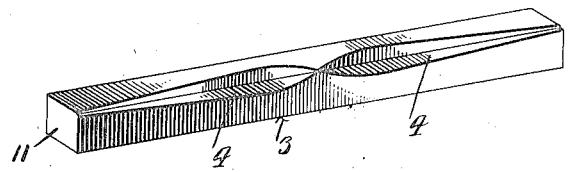
Figure 3:
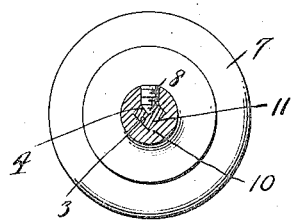

Figure 1 is a vertical sectional view taken through a mortise lock and showing the application of the device. Fig. 2 is a perspective view of the knob spindle. Fig. 3 is a section on the line *x*—*x* of Fig. 1.

Referring more particularly to the drawing, 1 represents the fragment of the door in which the rollback 2 is secured. Passing through the rollback is the ordinary rectangular knob spindle 3 which in this instance is provided with longitudinal V-shaped grooves 4 extending into the spindle at one corner thereof and running from opposite ends to the center of the spindle and having their deepest portions adjacent their inner terminals so that they both taper outwardly.

Mounted upon the spindle at opposite ends thereof are the roses which are provided with pointed projections 6 to enter the door. The knobs 7 are fitted upon the spindles in the usual manner and have threaded into their stems the screws 8 which in this instance are provided with conical ends to wedgingly fit the grooves. When both knobs are properly adjusted upon the spindle the roses will be held firmly in place without the necessity of using screws or other fastening devices and the use of adjusting washers is also obviated, it being understood, of course, that the screws will adjustably bind within the grooves at any point of adjustment of the knob on the spindle.

As will be noted upon reference to Fig. 3, the shape of the opening in the stem is such as to provide a right-angled socket portion 10, while the cross-section of the spindle is such as to form a right-angled portion 11 that fits the socket. Since the groove 4 is V-shaped, when the securing member or screw 8 is in place, the spindle 3 will be held at opposite points against any play. Furthermore, the V-shaped groove 4 and the V-shaped socket portion 11 prevent—when the spindle is secured in place—any tendency for the latter to work loose.

What is claimed is:—

The combination of a knob having a stem provided with a rectangular socket, a rectangular spindle insertible within said socket and having a corner thereof fitting a corner of the socket, there being a V-shaped groove in the corner of the spindle diagonally opposite the first-mentioned spindle corner, said groove progressively decreasing in depth toward the outer end of the spindle, a securing screw carried by said stem and provided with a conical end engageable with the V-shaped groove of the spindle and acting to force the first-mentioned corner of the spindle into said corner of the socket portion, whereby the spindle is held at diagonally opposite points against play within the socket in various positions of the socket portion longitudinally of the spindle.

In testimony whereof I affix my signature in presence of two witnesses.

CHARLES O. PHILLIPS.

Witnesses:
 ROY C. GAMBLE,
 MARK W. HEARN.